United States Patent [19]

Cappels, Sr.

[11] Patent Number: 5,512,961
[45] Date of Patent: Apr. 30, 1996

[54] METHOD AND SYSTEM OF ACHIEVING ACCURATE WHITE POINT SETTING OF A CRT DISPLAY

[75] Inventor: Richard D. Cappels, Sr., San Jose, Calif.

[73] Assignee: Apple Computer, Inc., Cupertino, Calif.

[21] Appl. No.: 36,349

[22] Filed: Mar. 24, 1993

[51] Int. Cl.$^6$ .................................. H04N 9/31
[52] U.S. Cl. ........................... 348/658; 348/173
[58] Field of Search ..................... 348/191, 175, 348/176, 189, 655, 656, 657, 658, 675, 679, 173; 345/151; 395/162, 161

[56] References Cited

U.S. PATENT DOCUMENTS

| | | | |
|---|---|---|---|
| 4,700,218 | 10/1987 | Thomsen et al. | 358/29 |
| 4,703,345 | 10/1987 | Matsuzaki et al. | 348/657 |
| 4,706,108 | 11/1987 | Kumagai et al. | 358/10 |
| 4,742,387 | 5/1989 | Oshima | 348/658 |
| 4,746,970 | 5/1988 | Hosokawa et al. | 348/658 |
| 4,962,418 | 10/1990 | Kamaga | 358/29 |
| 5,181,103 | 1/1993 | Aoyama | 348/658 |
| 5,258,828 | 11/1993 | Sano et al. | 348/658 |
| 5,270,802 | 12/1993 | Takagi et al. | 358/29 |
| 5,276,779 | 1/1994 | Statt | 395/109 |
| 5,311,294 | 5/1994 | Cromer et al. | 348/180 |
| 5,315,378 | 5/1994 | Satou et al. | 348/655 |
| 5,361,093 | 11/1994 | Yamamoto et al. | 348/223 |
| 5,369,432 | 11/1994 | Kennedy | 348/181 |

FOREIGN PATENT DOCUMENTS

| | | | |
|---|---|---|---|
| 0313795 | 5/1989 | European Pat. Off. | H04N 17/02 |
| 2169773 | 7/1986 | United Kingdom | H04N 9/73 |

OTHER PUBLICATIONS

Hitoshi Takaoka, Yoshinori Ogata, "A New Input Modulation Method for Generating Expected Colors on a CRT Monitor," 1991, pp. 57–60.
D. L. MacAdam, Color Measurement, Theme and Variation, 2nd ed, pp. 9–21.
Steve Roth, Managing Color, Jan. 1993—Macworld, pp. 148, 150–155.
Bruce Fraser, Getting Color in Sync, Mar. 1993—MacUser, pp. 165–167; 178–181.

Primary Examiner—Mark R. Powell
Attorney, Agent, or Firm—Carr, DeFilippo & Ferrell

[57] ABSTRACT

A system and method achieve and maintain an accurate white point setting of a CRT display in a computing system. The CRT is initially calibrated by individually driving the individual color cathodes and by measuring tristimulus values and cathode beam current for each of the three primary colors. The tristimulus values are normalized by dividing each value by the beam current producing it, and the normalized values are then stored in a calibration memory contained in the display unit. A table of gamma values representing beam current as a function of video drive voltage is measured and also added to the calibration memory. Calibration of the display is implemented by driving the display controller with a white point value and calculating the cathode beam currents from the stored tristimulus values, required to produce an accurate CRT representation of the signal sent to the display controller. The beam current is sampled through a digital feedback loop, and adjustments are made to the color drive circuitry of the display controller to produce the required beam currents for a given white point. Alternative images can be also used instead of white point images for making periodic recalibrations, by derating the beam currents for a given image according to values stored in the gamma table.

14 Claims, 3 Drawing Sheets

METHOD AND SYSTEM OF ACHIEVING ACCURATE WHITE POINT SETTING OF A CRT DISPLAY

BACKGROUND OF THE INVENTION

1. Field of the Invention

This invention relates to computer displays and more particularly to a method and system for achieving accurate white point settings in computer CRT displays by measuring and controlling the CRT beam current.

2. Description of the Background Art

Calibrating and maintaining accurate color settings on a computer CRT is a problem which is increasingly drawing attention of computer users as display technology and requirements advance. Although color CRT technology has improved dramatically over the past two decades, the increased availability of inexpensive digital video components has created a user demand for more exacting color reproduction in even the lowest cost computing systems.

This demand for precision color has resulted in the introduction of a number of elaborate devices and techniques for calibrating and adjusting the CRT displays of computing systems. Several products are currently available for measuring and providing highly accurate values of the luminance and hue of CRT displays. With such a device the user can display an image having known color characteristics, and manually calibrate the CRT display to produce the known characteristics of the image on the display screen or can manually initiate automatic calibration using an external light sensor.

The disadvantage of this manual calibration technique is that the measurement must be periodically made to the CRT, as the characteristics of the display change over time. Each of the three guns (one corresponding to each primary color, usually Red, Green, and Blue) will change over time as the cathodes wear and erode. The mechanisms of wear relate to changes in the amount of beam current resulting from the voltage drive from the computer and also to changes in the voltage from the computer that corresponds to no beam current (also referred to as "black level"), these are known as changes in emission and cutoff, respectively. These characteristics also change with temperature, notably for the first few minutes after a display is turned on and until it "warms up", but this warm-up drift often continues at a substantial rate for up to several hours after initial turn-on.

Other aging occurs in the screen phosphors. The phosphors become less efficient with time. The decrease in light output for a given beam power input is proportional to the total amount of energy delivered to the phosphor screen over the life of the screen. Fortunately, in many color displays, if the beam currents for the primary colors are kept in constant proportions, the hue of the emitted light will remain the same in spite of decreasing luminance.

Another wear mechanism is referred to as glass browning, which is manifested as loss of blue transmission. It is attributed to the metalization of the sodium ions in the glass that makes up the CRT envelope and is due to x-ray bombardment resulting from the impact of high-energy electrons, over several years of operation. With modern CRT glass formulations, sodium in the ionized state is relatively sparse, and browning is not a severe problem. It does, however, contribute measurably to color shift after many years of operation. Although the efficiency of screen phosphors changes over time, the light output continues to be a fairly linear function of input power, and thus input current.

As noted previously, the phosphors for each primary color generally age fairly uniformly such that if a given current ratio is maintained over the life of the CRT, the color of light emitted will not vary much. A typical example is the 14" Trinitron (™ Sony Corp.) color monitor used by Apple Computer. If beam currents are maintained at luminance levels above the maximum shipped brightness, the hue drift would amount to about 2.7 $\Delta E^*$ units over the first 2,000 hours (1 $\Delta E^*$ is similar to a just-noticeable difference in color).

Since the emission and cutoff of the cathodes age continuously, the operating points of the tube must constantly be re-adjusted to maintain precise color rendition. What is needed is a system for measuring the current to each CRT cathode and for adjusting the voltage signal delivered to the cathode from the CPU to obtain the desired current, and therefore the desired luminance from each primary color to ultimately obtain the desired hue and luminance.

SUMMARY OF THE INVENTION

In accordance with the present invention, a method and system are disclosed for achieving an accurate white point setting in a computer CRT display. In the preferred embodiment of the present invention, a processor generates and communicates a digital video signal to a display controller. The display controller transmits analog video signals to an analog controller. The analog controller produces three analog voltages which are converted to analog beam currents by the cathodes of the CRT. A current sensor is coupled between the video display controller and the CRT, and measures the beam current levels generated by the display controller. A spectraradiometer is positioned in front of the CRT to capture the image corresponding to the digital video signal generated by the CPU. The spectraradiometer measures the tristimulus values of the image. Initial calibration of the display normally occurs at the factory where the display is finally assembled. The calibration proceeds by sequentially driving each of the primary color cathodes independently. Three tristimulus values and the individual beam currents are measured for each of the cathodes, to produce a total of nine normalized tristimulus values, which are stored in a calibration memory. Also during factory calibration, a gamma table is constructed and stored in calibration memory, which maps the relationship between cathode drive voltage and analog beam current for each of three cathodes.

Following the measurement of normalized tristimulus values and generation of the gamma table, the CRT is calibrated to an arbitrary white point using the normalized tristimulus values. Target beam currents are calculated and stored to achieve the white point setting, and the CPU generates a digital video signal to display the white point on the CRT. The analog beam currents resulting from the amplifier video signal from the video display controller are compared to the target beam currents, and the gain of the video display controller is adjusted to match the actual beam currents to those calculated.

Once the initial CRT calibration has occurred, recalibration of the CRT can be easily implemented by regenerating the white point image by the CPU, and comparing the resulting beam currents to those originally calculated and now stored in the calibration memory. The CPU makes necessary adjustments to the gain of the analog controller to compensate for aging effects of the CRT display. An alternative recalibration method is effected by displaying any image (not necessarily a white point), and by using the gamma table to determine the appropriate theoretical beam currents for the image being displayed. Adjustment to the video display control circuitry is made as above, to adjust the beam currents to their proper levels.

DESCRIPTION OF THE PREFERRED EMBODIMENT

Figure 1:
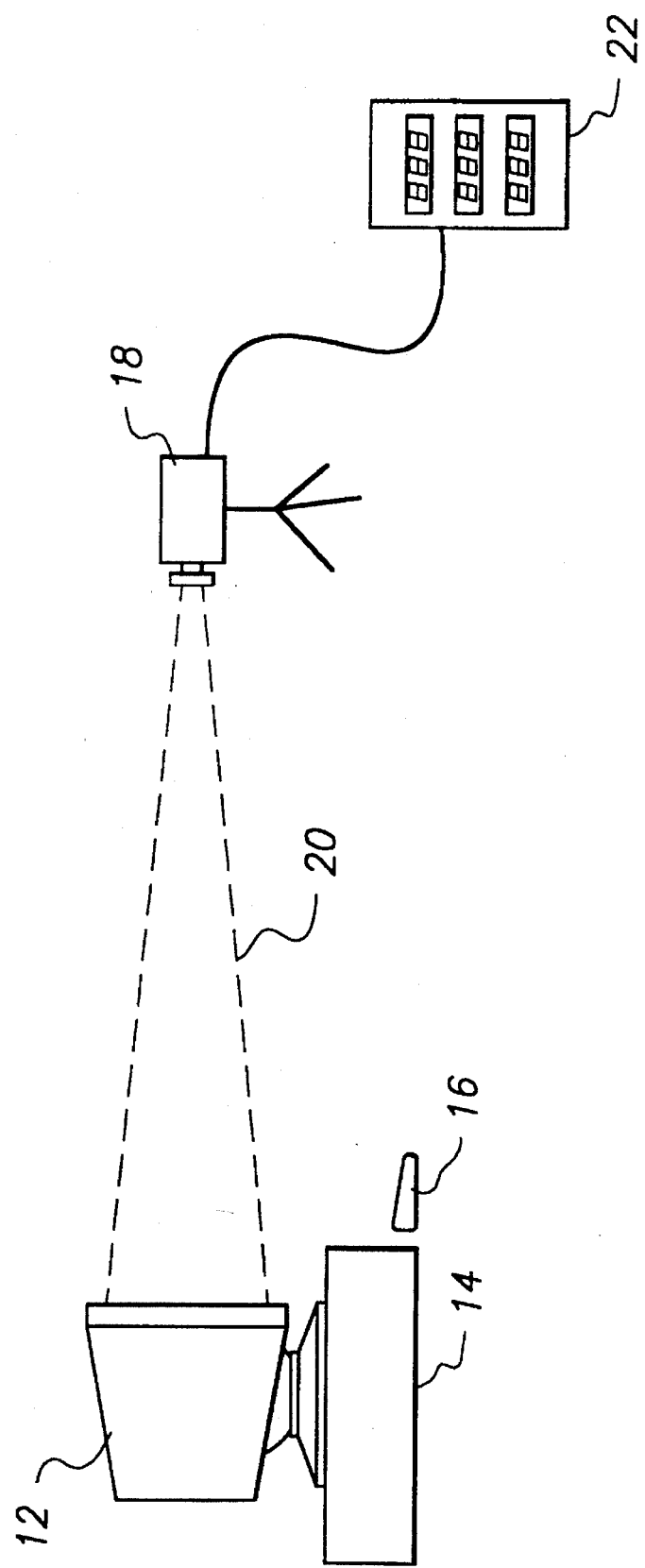
FIG. 1 is a pictorial diagram showing a system for measuring the color/content of a video display as performed in the prior art.

Referring now to FIG. 1, a prior art system for measuring and calibrating the color of a video display 12 is shown. In addition to video display 12 connected to a CPU 14, the calibration system contains a spectraradiometer 22 for measuring the tristimulus values of the light emitted from the display 12. The spectraradiometer could be substituted by various other conventional light measuring devices, including a photometer. Tristimulus values represent the total amount of energy passing through three overlapping optical bands, called X, Y, and Z. The bands, X, Y, and Z correspond to the three channels of a model of human color vision, in which whenever the ratios of energy in the bands are in a given proportion, a standard observer is said to perceive a given hue. The summed weighted energies of these three bands describe the luminance of the light. In other words, a given set of tristimulus values represents a specific hue at a specific intensity. The ratio of values presented to X, Y, and Z correspond to a given hue.

CRT phosphors will typically stimulate the X, Y, and Z channels such that the degree of stimulation of each of the three channels will differ depending upon the color and luminance of the particular phosphor. Tristimulus values are discussed in detail in *Color Measurement, Theme and Variation*, D. L. MacAdam, 2nd ed., Springer–Verlag, pp. 9–21. It is these X, Y, and Z values that are sensed by a conventional spectraradiometer 22 which is calibrated to accurately measure the tristimulus values of light for the display 12.

In order to calibrate video display 12, an image of known chromaticity such as a white screen is generated by CPU 14 and displayed. Spectraradiometer 22 measures and displays the tristimulus values of this image. In one embodiment of the prior art, the amount of red, blue, and green can be adjusted on video display 12, using color controls 13 located on the video display. The controls 13 are adjusted until the tristimulus value readings on spectraradiometer 22 match the expected chromaticity readings of the image being produced by CPU 14. In an alternative embodiment, the compensations to video display 12 are manually applied using color correction mechanisms contained within CPU 14. The measured tristimulus values are read for spectraradiometer 22 as before, and entered into CPU 14 through keyboard 16. CPU 14 compares the chromaticity of the originally known signal to the chromaticity of the displayed image, and corrections to video display 12 are implemented by the computer. In a third prior art embodiment, a user may hold cards or colored strips adjacent to video display 12 in order to compare a known image generated by CPU 14 to a color strip (not shown) having a known chromaticity. This method is prone to great error due to the colored strip's chromaticity being partially determined by ambient lighting. Adjustments are made either to color controls 13 or through CPU 14 to compensate the chromaticity of video display 12, to match those of the colored strips.

Figure 2:
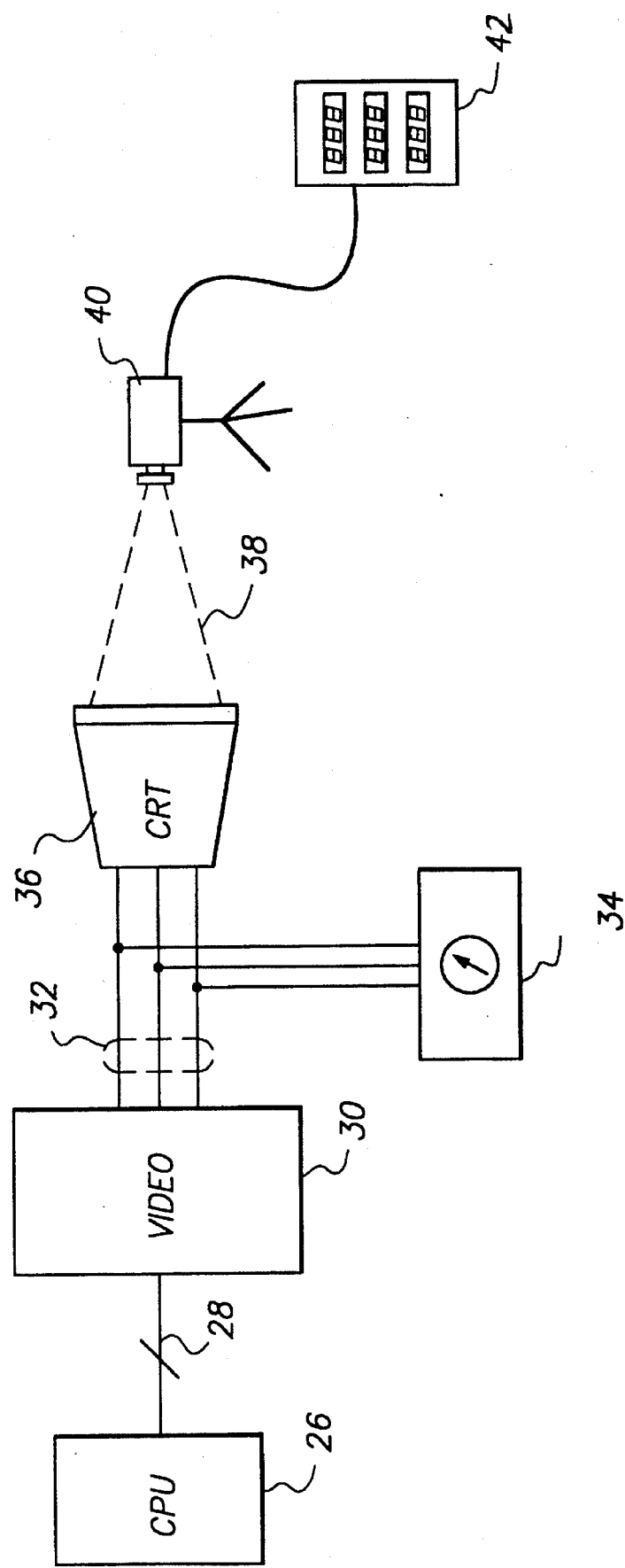
FIG. 2 is a schematic diagram of the present invention showing a system/for measuring and calibrating the white point setting of a CRT display.

Referring now to FIG. 2, a calibration system 25 of the present invention is shown for initially measuring the chromatic characteristics of a CRT 36. In the preferred embodiment of the present invention, system 25 is employed during factory assembly of CRT 36, but alternatively may be employed by a computer distributor or service center. The purpose of system 25 is to measure the relationship between CRT beam currents 32 and the color tristimulus values produced by CRT 36, to store these measurements in a calibration memory 24, and to calibrate the video signal 28 produced by CPU 26 so that a known and desired relationship exists between video signal 28 and the chromaticity of the corresponding image displayed on CRT 36.

Processor 23 may be any computing processor in a video-based system. Processor 23 of FIG. 2 is shown as a component in CPU 26 of a general purpose computer. In the preferred embodiment, processor 23 is a multi-chip integrated circuit microprocessor based in an Apple Macintosh computer manufactured by Apple Computer, Inc. of Cupertino, Calif. Calibration memory 24 may be any non-volatile memory such as Erasable Programmable Read-Only Memory (EPROM) or a Programmable Read-Only Memory (PROM) which is programmed during calibration of the display containing CRT 36. Calibration memory 24 contains tristimulus values 27 and gamma values 29 (discussed in more detail below) for each of the primary cathodes which comprise CRT 36. Additionally, other information may be stored in calibration memory 24 such as the calibration history (when and where calibrated) as well as recalibration adjustments made to the beam currents by the system as described with respect to FIG. 3 below. Calibration memory 24 is preferably contained internal to the physical display unit housing CRT 36 and communicates with CPU 26 via digital data bus 33. The reason for containing calibration memory 24 within the CRT 36 housing, is that the calibration of CRT 36 is principally a measurement and compensation for the variations in cathode drive characteristics and phosphor luminances which exist between CRT's. The objective of calibration is to measure the tristimulus values as a function of beam currents 32 for each of the primary colors, to enable the accurate rendering of specific colors during normal operation. The beam currents 32 and tristimulus values needed to obtain specific colors and luminances are a function of the CRT 36 and not of the CPU 26. Once a particular CRT 36 is calibrated, the tristimulus values displayed will be the same for a given analog video signal 28 transmitted by CPU 26.

Display controller 30 is conventional, converting the digital video signals communicated from processor 23 to analog video signals that result in beam currents 32. Display controller 30 is generally located in the same physical CPU 26 housing as processor 23 and communicates with processor 23 via a digital data bus 37. Display controller 30 consists of a digital-to-analog converter and various buffers for maintaining the voltage levels required to drive an analog controller 45 (discussed with reference to FIG. 3 below) of a video display. Generally three voltage signals provide drive to CRT 36 cathodes; resulting in an individual beam current 32 on each of the cathodes for the red, blue, and green primary colors. It is each of these three beam currents 32 which are carefully calibrated and controlled in the present invention to produce color images on CRT 36. This control produces images which are chromatically reproducible over time and are identical between various CRT's.

Current sensor 34 is coupled between analog controller 45 and CRT 36, and measures each of the three beam currents 32. In the preferred (FIG. 3) embodiment, current sensor 34 comprises a sampling circuit for sampling beam current 32 and an Analog to Digital Converter (ADC) for converting the analog beam samples to a digital data value. Conventional sampling circuit 54 and ADC 50, also used in display recalibration, are discussed more fully with respect to FIG. 3 below. Alternatively, a conventional current sensor 34 can be attached directly to beam currents 32 through circuitry contained in analog controller 45.

Calibration system 25 is generally operated by applying beam currents to each of the individual cathodes 35 in CRT 36, and measuring the corresponding beam current 32 and the resulting set of tristimulus values on spectraradiometer 42. The first step of the calibration process is to apply a sufficient current to one of three beam currents 32 to produce accurately measurable current levels on the corresponding cathode 35 of CRT 36. The CRT 36 emission resulting from this beam current 32 and the corresponding set of X, Y, and Z tristimulus values is measured on spectraradiometer 42. The three tristimulus values of this set are then normalized by dividing each by the relevant beam current 32 to produce the values X/amp, Y/amp, and Z/amp. The normalized values are then stored in calibration memory 24. This tristimulus measurement process is then repeated for each of the other two beam currents 32, until three sets of primary color tristimulus measurements (nine tristimulus values total) are normalized and stored in calibration memory 24.

The second step of the factory calibration process is to generate a gamma table 29, which maps the relationship between the cathode 35 voltages and the beam currents 32 for each of the three primary color beams. The beam currents 32 are often exponential with respect to their driving voltages. This non-linearity manifests itself as an exponential relationship, the exponent often being known as the CRT gun's "gamma". During the calibration process, beam currents are measured for various values of video signals 28 from CPU 26. These values are stored in gamma table 29 so that beam currents 32 can be predicted as a function of digital video level. The number of such measured values is not critical, and depends largely on the degree of non-linearity exhibited by the guns being measured. Generally, a sufficient number of gamma points should be measured to allow for reasonably accurate interpolation. The gamma table and normalized tristimulus values for each gun are used for recalibration of the display 36 with reference to FIG. 3, below.

Figure 3:
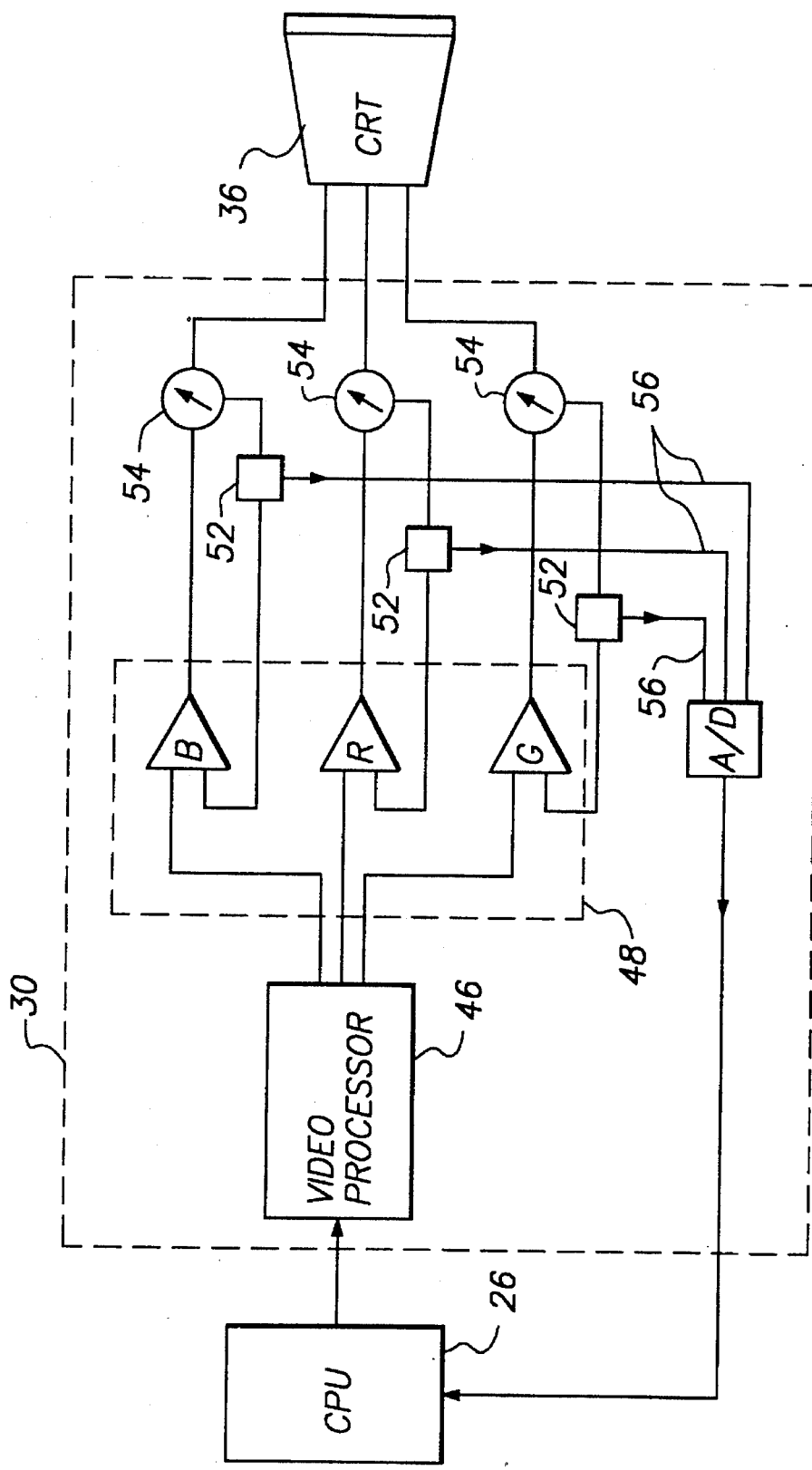
FIG. 3 is a schematic diagram of the present invention showing a system for maintaining accurate white point setting of a CRT display.

Referring now to FIG. 3, a system is shown for periodically recalibrating and compensating CRT 36 for degradation effects due to warm-up, and for allowing the user to accurately reset the white point to an arbitrary color. CPU 26 is shown connected to analog controller 45, which comprises three video amplifiers 47, one amplifier for each primary color channel. Video amplifiers 47 are characterized by a high input impedance, and an output impedance sufficiently low to drive a CRT cathode. A set of current samplers 54, one for each beam current 32, allows Analog to Digital Converter (ADC) 50 to sense the magnitude of beam currents 32. Current samplers 54 are well known by those practicing in the art and may consist of such components as current mirrors or networks of passive electronic components. ADC 50 samples the individual beam currents 32 and digitizes the sampled current, to produce a digital current measurement which is then communicated to CPU 26 along bus 49.

To calibrate CRT 36 to an arbitrary white point (arbitrary color of white) CPU 26 accesses the normalized tristimulus values 27 stored in calibration memory 24 and calculates the amount of beam current required by each cathode to obtain the desired hue and luminance from the CRT. The beam currents are found by solving the following set of equations: The defining formulae $$Xc = (R\ Xr) + (G\ Xg) + (B\ Xb)$$

$$Yc = (R\ Yr) + (G\ Yg) + (B\ Yb)$$

$$Zc = (R\ Zr) + (G\ Zg) + (B\ Zb)$$

Solutions for R, G and B:

$$R = ((Xg\ Yb - Xb\ Yg)Zc)/$$
$$(Xr\ Yg\ Zb - Xg\ Yr\ Zb - Xr\ Yb\ Zg + Xb\ Yr\ Zg + Xg\ Yb\ Zr - Xb\ Yg\ Zr) + (Yc(-(Xg\ Zb) + Xb\ Zg))/$$
$$(Xr\ Yg\ Zb - Xg\ Yr\ Zb - Xr\ Yb\ Zg + Xb\ Yr\ Zg + Xg\ Yb\ Zr - Xb\ Yg\ Zr) + (Xc(Yg\ Zb - Yb\ Zg))/$$
$$(Xr\ Yg\ Zb - Xg\ Yr\ Zb - Xr\ Yb\ Zg + Xb\ Yr\ Zg + Xg\ Yb\ Zr - Xb\ Yg\ Zr)$$

$$G = ((-(Xr\ Yb) + Xb\ Yr)Zc)/$$
$$(Xr\ Yg\ Zb - Xg\ Yr\ Zb - Xr\ Yb\ Zg + Xb\ Yr\ Zg + Xg\ Yb\ Zr - Xb\ Yg\ Zr) + (Yc(Xr\ Zb - Xb\ Zr))/$$
$$(Xr\ Yg\ Zb - Xg\ Yr\ Zb - Xr\ Yb\ Zg + Xb\ Yr\ Zg + Xg\ Yb\ Zr - Xb\ Yg\ Zr) + (Xc(-(Yr\ Zb) + Yb\ Zr))/$$
$$(Xr\ Yg\ Zb - Xg\ Yr\ Zb - Xr\ Yb\ Zg + Xb\ Yr\ Zg + Xg\ Yb\ Zr - Xb\ Yg\ Zr)$$

$$B = ((Xr\ Yg - Xg\ Yr)Zc)/$$
$$(Xr\ Yg\ Zb - Xg\ Yr\ Zb - Xr\ Yb\ Zg + Xb\ Yr\ Zg + Xg\ Yb\ Zr - Xb\ Yg\ Zr) + (Yc(-(Xr\ Zg) + Xg\ Zr))/$$
$$(Xr\ Yg\ Zb - Xg\ Yr\ Zb - Xr\ Yb\ Zg + Xb\ Yr\ Zg + Xg\ Yb\ Zr - Xb\ Yg\ Zr) + (Xc(Yr\ Zg - Yg\ Zr))/$$
$$(Xr\ Yg\ Zb - Xg\ Yr\ Zb - Xr\ Yb\ Zg + Xb\ Yr\ Zg + Xg\ Yb\ Zr - Xb\ Yg\ Zr)$$

where

Xc,Xr, Xg,Xb,Yc, Yr,Yg, Yb,Zc, Zr,Zg, and Zb are the tristimulus values of the r, g, and b primaries, normalized to the beam current.

R, G, and B are the beam currents for each primary.

Once beam currents 32 are calculated for the desired white point, CPU 26 generates a video signal 28 having a defined "white" luminance. Individual beam currents 32 used to drive the Red, Green, and Blue cathodes 35 are sensed by current samplers 54 and digitized by ADC 50. CPU 26 then adjusts the gains of video amplifiers 47 via a control signal 38 to analog controller 45, to achieve the beam current values calculated using the equations above. When the desired beam currents are obtained, the desired tristimulus values for each primary will also be obtained, and thus the desired white point will be displayed on CRT 36.

Using beam current values 31 stored in calibration memory 24, recalibration of CRT 36 can be easily performed to adjust the gain of video amplifiers 47 to maintain constant beam currents 32 as CRT cathode 35 degradation occurs. Recalibration consists of CPU 26 sending a white point test signal to CRT 36 via video display controller 30, and measuring the beam currents 32, as described above, for each of the three color cathodes. CPU 26 compares the measured beam currents 32 with the beam current values 31 stored in calibration memory 24 and appropriately adjusts video amplifiers 47 to restore beam currents 32 to the values originally stored as beam current values 31.

This calibration can also be performed automatically in the background without the need to display a standard white point test signal. In the case of automatic background calibration, a program running on CPU 26 operates in the background, examining the chromaticity of video images generated by processor 23, while CPU 26 is performing its normal tasks. Using gamma table 29 stored in calibration memory 24, processor 23 calculates the average beam current that would result at each beam current sampler 54 if CRT 36 was calibrated. The actual average beam currents are sensed by current sampler 54 and the sampled beam currents are measured by ADC 50 and supplied to CPU 26. If the measured beam currents differ from those calculated, CPU 26 adjusts the gain of the Red, Green, and Blue channels, via control signal 38, until the sensed average currents match the calculated average beam currents. Thus, the color of the display is maintained even though the colors displayed are not the same as those displayed during original calibration, and it is also possible to set the white point of the display to any arbitrary point within the gamut of the display.

The invention has now been explained with reference to specific embodiments. Other embodiments will be apparent to those of ordinary skill in the art in light of this disclosure. For example, instead of adjusting the gains of video amplifiers 47, the same effect can be achieved by adjusting the amplitude of the video signal exported to analog controller 45 by CPU 26. Also, it will be obvious to those skilled in the art that other display devices such as plasma displays and light emitting diodes having various signal receiving electrodes may be used in place of CRTs. Therefore, it is not intended that this invention be limited, except as indicated by the appended claims.

What is claimed is:

1. A calibration system for accurately displaying color images on a computer display, comprising:

processor means external to the computer display for generating color digital video signals;

control means external to the computer display and connected to the processor means for receiving digital video signals and responsively generating analog video signals;

display means, including amplifier means and electrode means, coupled to the control means for receiving said analog video signals and responsively amplifying said analog video signals to produce analog voltages and displaying video images;

current sensing means coupled between the amplifier means and the electrode means, for measuring beam currents resulting from the analog voltages and generating beam current measurements;

color measurement means for generating tristimulus value measurements of the displayed images, and for transmitting the tristimulus value measurements and the beam current measurements to the processor means which divides the tristimulus value measurements by the beam current measurements to obtain normalized tristimulus value measurements; and memory means connected to the processor means for storing the normalized tristimulus value measurements and the current measurements transmitted by the color measurement means.

2. The system for accurately displaying color images on a computer display means according to claim 1, wherein the analog video signals comprise Blue, Red and Green primary color components.

3. The system for accurately displaying color images on a computer display according to claim 2, wherein the analog voltages drive corresponding electrodes in the display means.

4. The system for accurately display color images on a computer display according to claim 2, wherein the current sensing means generates a current measurement for each of the analog primary color components.

5. The system for accurately displaying color images on a computer display according to claim 1, wherein the color measurement means is a spectraradiometer for generating the tristimulus value measurements of the images.

6. The system for accurately displaying color images on a computer display according to claim 1, wherein gamma values are computed based on the current measurements of the display means, and are stored in the memory means.

7. A calibration system for accurately displaying color images on a computer display, comprising:

processor means external to the computer display for generating color digital video signals;

display control means external to the computer display and connected to the processor means for receiving the digital video signals and responsively generating analog video signals;

analog control means connected to the display control means for receiving and amplifying the analog video signals and therefrom generating analog voltages, and connected to said processor means for receiving a gain control signal and responsively controlling the gain of amplification by the analog control means;

display means connected to the analog control means for receiving said analog voltages and responsively displaying video images;

current sensing means including current sampling means connected between said analog control means and said display means, for measuring beam currents resulting from the analog voltages and generating beam current measurements, and analog to digital conversion means connected between the current sampling means and the processor means, for receiving the beam current measurements from the current sampling means for converting the beam current measurements to digital current measurement signals, and for communicating the digital current measurement signals to the processor means which responsively adjusts the gain control signal for calibrating the control means; and color measurement means for generating tristimulus value measurements of the displayed images and for transmitting the tristimulus value measurements to the processor means which normalizes the tristimulus value measurements with respect to the beam current measurements.

8. The system for accurately displaying color images on a computer display according to claim 1, wherein the normalized tristimulus value measurements are stored in the memory means prior to transmission to the processor means.

9. A method for accurately displaying color on a computer display having individual display electrodes, comprising the steps of:

a) determining first white point beam current values for the computer display during use, including the steps of
i) measuring a first beam current applied to one of the individual electrodes to produce a first beam current measurement;

ii) measuring tristimulus values of light produced by the computer display;

iii) calculating normalized tristimulus values by dividing the tristimulus values by the first beam current measurement;

iv) repeating steps (i) through (iii) for each of the remaining individual electrodes; and v) calculating the first white-point beam current values from the normalized tristimulus values;

b) applying computer-generated white point video signals to the computer display for producing second beam currents at the individual display electrodes, said video signals generated by a host computer system external to the computer display;

c) measuring the second beam currents to produce second white point beam current measurements;

d) comparing the second white point beam current measurements to the determined first white point beam current values; and e) adjusting the computer-generated video signals to produce new second white point beam current measurements approximately equivalent to the determined first white point beam current values.

10. The method for accurately displaying color on a computer display according to claim 9, wherein the method for calculating the first white point beam current values from the tristimulus values further comprises solving the following set of equations:

The defining formulae:

$$Xc = (R\ Xr) + (G\ Xg) + (B\ Xb)$$

$$Yc = (R\ Yr) + (G\ Yg) + (B\ Yb)$$

$$Zc = (R\ Zr) + (G\ Zg) + (B\ Zb)$$

Solutions for R, G and B:

R =
((Xg Yb − Xb Yg)Zc)/
(Xr Yg Zb − Xg Yr Zb − Xr Yb Zg + Xb Yr Zg + Xg Yb Zr − Xb Yg Zr) + (Yc(−(Xg Zb) + Xb Zg))/
(Xr Yg Zb − Xg Yr Zb − Xr Yb Zg + Xb Yr Zg + Xg Yb Zr − Xb Yg Zr) + (Xc(Yg Zb − Yb Zg))/
(Xr Yg Zb − Xg Yr Zb − Xr Yb Zg + Xb Yr Zg + Xg Yb Zr − Xb Yg Zr)

G =
((−(Xr Yb) + Xb Yr)Zc)/
(Xr Yg Zb − Xg Yr Zb − Xr Yb Zg + Xb Yr Zg + Xg Yb Zr − Xb Yg Zr) + (Yc(Xr Zb − Xb Zr))/
(Xr Yg Zb − Xg Yr Zb − Xr Yb Zg + Xb Yr Zg + Xg Yb Zr − Xb Yg Zr) + (Xc(−(Yr Zb) + *Yb Zr*))/

-continued
(Xr Yg Zb − Xg Yr Zb − Xr Yb Zg + Xb Yr Zg + Xg Yb Zr − Xb Yg Zr)

B =
((Xr Yg − Xg Yr)Zc)/
(Xr Yg Zb − Xg Yr Zb − Xr Yb Zg + Xb Yr Zg + Xg Yb Zr − Xb Yg Zr) + (Yc(−(Xr Zg) + Xg Zr))/
(Xr Yg Zb − Xg Yr Zb − Xr Yb Zg + Xb Yr Zg + Xg Yb Zr − Xb Yg Zr) + (Xc(Yr Zg − Yg Zr))/
(Xr Yg Zb − Xg Yr Zb − Xr Yb Zg + Xb Yr Zg + Xg Yb Zr − Xb Yg Zr)

where Xc, Xr, Xg, Xb, Yc, Yr, Yg, Yb, Zc, Zr, Zg, and Zb are the tristimulus values of r, g, and b primaries, normalized to the first beam currents; and R, G, and B are the first beam currents for each primary.

11. The method for accurately, displaying color on a computer display according to claim 9, further comprising the step of storing the calculated first white beam current values in a calibration memory 12. A method for accurately displaying color on a computer display, comprising the steps:

a) determining first beam current values and gamma values for the computer display, said first beam current values calculated using normalized tristimulus values corresponding to the computer display;

b) applying computer-generated video signals having a known color content to the display for producing second beam current values at individual display electrodes, said video signals generated by a host computer system external to the computer display;

c) measuring the second beam current values produced by the video signals;

d) comparing the measured second beam current values to the determined first beam current values and gamma values; and e) adjusting the computer-generated video signals to produce new measured second beam current values approximately equivalent to the determined first beam current values.

13. The method for accurately displaying color on a computer display according to claim 12, wherein the step a) of determining the gamma values further comprises measuring the second beam currents for various values of video signals at each of the individual electrodes.

14. The method for accurately displaying color on a computer display according to claim 12, further comprising the step of storing the determined first beam current values and the gamma values in a calibration memory.

* * * * *